United States Patent [19]

Furukawa

[11] Patent Number: 5,638,672
[45] Date of Patent: Jun. 17, 1997

[54] CHAIN CABLE RETAINER

[75] Inventor: Tsuyoshi Furukawa, Tokyo, Japan

[73] Assignees: Fujitsu Limited, Kawasaki; Takachiho Koheki Co., Ltd., Tokyo, both of Japan

[21] Appl. No.: 322,567

[22] Filed: Oct. 13, 1994

[30] Foreign Application Priority Data

Oct. 13, 1993 [JP] Japan ................. 5-255630
Oct. 13, 1993 [JP] Japan ................. 5-255631

[51] Int. Cl.⁶ ............................................. F16G 13/16
[52] U.S. Cl. ............................................. 59/78.1; 248/49
[58] Field of Search .......................... 59/78.1; 248/49

[56] References Cited

U.S. PATENT DOCUMENTS

| | | | |
|---|---|---|---|
| 3,664,619 | 5/1972 | Heidrich et al. | 59/78.1 |
| 3,779,003 | 12/1973 | Boissevain et al. | 59/78.1 |
| 4,392,344 | 7/1983 | Gordon et al. | |
| 4,570,437 | 2/1986 | Moritz | 59/78.1 |
| 4,625,507 | 12/1986 | Moritz et al. | 59/78.1 |
| 4,658,577 | 4/1987 | Klein | |
| 4,672,805 | 6/1987 | Moritz | |
| 4,807,432 | 2/1989 | Mauri | |
| 5,038,556 | 8/1991 | Moritz et al. | |
| 5,201,885 | 4/1993 | Wehler et al. | 59/78.1 |

FOREIGN PATENT DOCUMENTS

| | | | |
|---|---|---|---|
| 192853 | 9/1986 | European Pat. Off. | 59/78.1 |
| 620382 | 10/1994 | European Pat. Off. | 59/78.1 |
| 186146 | 7/1990 | Japan | 59/78.1 |
| 5141481 | 6/1993 | Japan | 59/78.1 |
| 8902844 | 6/1991 | Netherlands | 59/78.1 |

*Primary Examiner*—David Jones
*Attorney, Agent, or Firm*—Armstrong Westerman Hattori McLeland & Naughton

[57] ABSTRACT

A chain cable retainer includes a plurality of same-size link members made of a resilient material and connected to each other in a longitudinal direction to form a flexible guide for guiding a cable. Each member includes a bottom plate and a pair of side plates integrally attached to the bottom plate. The pair of side plates includes a pair of front, outside plates and a pair of rear, inside plates integrally connected to the respective ends of the outside plates. The inside plates are provided with projections and outside plates are provided with holes engaged with the projections, in such a manner that a link member can be pivotably engaged with respect to an adjacent link member. A low-rigidity part, such as a longitudinal groove, is provided on each of the side plates, so that the pair of inside plates can easily be inserted into the pair of outside plates to allow the projections to engage with the holes.

7 Claims, 4 Drawing Sheets

CHAIN CABLE RETAINER

BACKGROUND OF THE INVENTION

1. Field of the Invention

This invention relates to a cable retainer for holding a flexible cable and more particularly relates to a chain cable retainer comprising a plurality of same-size link members longitudinally connected to each other so that the respective link members can be rotated with respect to each other.

2. Description of the Related Art

In an apparatus, e.g., an industrial robot or the like, having a movable part moving in relation to a body, it is often necessary to electrically connect the body to the movable part. In such a case, if the electrical cable connecting the body to the movable part was left without protection, the electrical cable can come in touch with other members and could be damaged, cut or broken.

Therefore, in a conventional technique, when a cable is used to connect a body with a movable part, the cable is accommodated in a flexible cable retainer formed as, for example, a continuous chain to protect the cable. Such a chain cable retainer is constituted in such a manner that the retainer can be deformed when there is a relative movement between the body and the movable part, so that it is possible to protect the electrical cable from the external environments without restricting the movement of the movable part.

A cable retainer as mentioned above is disclosed in Japanese Unexamined Utility Model Publication (Kokai) No. 62-200836. In this prior art, the link members constituting the chain cable retainer have a so-called closed structure to improve the protection of an electrical cable.

In the above-mentioned prior art, as shown in FIGS. 5 and 6, a chain cable retainer 50 is constituted by connecting a plurality of link members 52, one by one, in a longitudinal direction. However, if one end of the cable retainer is fixed to the body and the other end is fixed to the movable part, it is necessary to mount special fixing latches 53 and 55, which have shapes different from that of the link members 52 constituting the body of the cable retainer 50, on the ends of the cable retainer 50. Since the cable retainer 50 is constituted by continuously connecting the same-size link members 52, the connecting structure at one end (at A in FIG. 5) of the cable retainer is different from that at the other end (at B in FIG. 5) thereof, so that it is necessary to prepare two kinds of latches 54 and 56 suitable for the respective ends of the cable retainer.

Consequently, in the prior art, the cable retainer needs one kind of the link member 52 constituting the body of the cable retainer and the two kinds of latches 54 and 56 for fixing both ends of the cable retainer 50. Thus, it is necessary to prepare three kinds of parts. Due to the production of a plurality of different parts, it is necessary to prepare a plurality of dies for forming the respective pieces and thus there is a problem that the cost of production of cable retainer is increased.

Further, in the prior art, there is another problem as follows. Generally, the link members 52 are continuously connected to each other in a longitudinal direction to produce a chain cable retainer as shown in FIG. 5. For this end, each link member 52 has a pair of side plates 60 connected to a bottom plate 58 (at the opposite sides of the bottom plate 58) and facing each other. The side plates 60 can be opened to allow a pair of cylindrical projections 62 arranged at the rear end of the link member 52 to slidingly move along the inner walls of the side plates 60. Thus, the projections 62 are engaged with hole 64 arranged at the front of the side plates 60. Thus the link members 52 are connected to each other.

In such a connected structure of the link members 52, if the side plates 60 and the bottom plate 58 were made thicken to increase the rigidity of the link members, when the link members 52 were connected to or disconnected from each other, a strong force would be required to open the side plates 60. Thus, there is a problem that, without special tools, the link members 52 cannot be connected to or disconnected from each other.

In the above-mentioned prior art, there is still another problem. Each link member 52 is provided with restricting means 53 (FIG. 6) for restricting the angle through which the link member 52 can be pivotably moved with respect to the adjacent link member 52. The angle restricting means 53 comprises a pair of recesses 55 provided at front ends of the link members 52 and a pair of tongues 57 provided at the rear end of the link member 52 and engaged with the recesses 55. Thus, the link member 52 can be pivotably moved, around the projections 62, between two positions in which the upper and lower ends 57a and 57b of the tongue 57 come into contact with upper and lower inside walls 55a and 55b, respectively. The pivot angle of the link member 52 is thus restricted in a range of $\beta$–$\alpha$ in FIG. 6. Therefore, the cable accommodated in the cable retainer is protected in such a manner that the radius of curvature of the cable cannot become too small and the cable is not damaged.

However, in the prior art, as shown in FIG. 6, the link member 52 is provided with the angle restriction recesses 56. Therefore, the mold for producing the link members is so complicated that the manufacturing cost for the link member increases and, therefore, the cable retainer may be expensive as a whole.

SUMMARY OF THE INVENTION

Accordingly, an object of the present invention is to provide a chain cable retainer in which the number of the kinds of parts can be reduced and thus the cost for making such a chain cable retainer can be reduced.

Another object of the present invention is to provide a chain cable retainer in which connection and disconnection of the link members can be easily performed without reducing the rigidity of the link members.

According to one aspect of the present invention, there is provided a chain cable retainer comprising: a plurality of same-size link members made of a resilient material and connected to each other in a longitudinal direction to form a flexible guide for guiding therein a cable, each of the link members comprising:

a bottom plate;

a pair of side plates integrally attached to the bottom plate and extending in the longitudinal direction and spaced to each other to define therebetween a cable guide passage;

the pair of side plates comprising: a pair of front, outside plates having respective inner faces and a pair of rear, inside plates integrally connected to respective ends of the outside plates and having respective outer faces, so that a first distance between the inner faces of the outside plates is the same as or slightly larger than a second distance between the outer faces of the inside plates;

engaging means comprising projections protruding in a transverse direction provided on each of the inside plates and holes provided in each the outside plates;

the projections and the holes being engaged with each other, in such a manner that the link member can be pivotably engaged with an adjacent link member;

at least one low-rigidity part provided on the side plates, so that the pair of inside plates can be easily inserted into the pair of outside plates to engage the projections with the holes.

In the chain cable retainer according to the invention constituted as mentioned above, a mounting hole can be provided to fix the outside plate and/or the bottom plate of the link member to an object. Therefore, it is possible that only one kind of same-size link members is required to constituted the body of the cable retainer and the preparation of special latches is not required. Thus it is possible to reduce the cost of the cable retainer by reducing the number of the kinds of the parts.

Also, low rigidity grooves may be arranged near the connecting portions between the bottom plate and the outside plates of the link member and/or the connecting portions between the bottom plate and inner plates, so that these portions function as hinges. Thus, it is easy to open or close the outside plates or inside plates so that the disconnection of the link members is simplified.

According to another aspect of the present invention, there is provided a chain cable retainer comprising: a plurality of same sized link members made of a resilient material and connected to each other in a longitudinal direction to form a flexible guide for guiding therein a cable, each of the link members comprising:

a bottom plate;

a pair of side plates integrally attached to the bottom plate to extend in the longitudinal direction and spaced from each other to define therebetween a cable guide passage;

the pair of side plates comprising: a pair of front, outside plates having respective inner faces and a pair of rear, inside plates integrally connected to respective rear ends of the outside plates and having respective outer faces, so that a first distance between the inner faces of the outside plates is the same as or slightly larger than a second distance between the outer faces of the inside plates;

the pair of outside plates having respective forward portions extending forwardly from the bottom plate;

engaging means comprising projections protruding in a transverse direction provided on each of the inside plates and holes provided in each of the outside plates;

the projections and the holes being engaged, with each other, in such a manner that the link member can be pivotably engaged with respect to an adjacent link member;

restricting means for restricting the pivot angle of the link member with respect to the adjacent link member to a certain angle range; and the restricting means comprising step portions located at connecting portions between the outside plates and inside plates, and at the forward portions of the outside plates, so that the forward portions comes into contact with the respective step portions to restrict the pivot angle.

The step portions may be flat planes perpendicular to the longitudinal direction and the forward portions of the outside plates may have respective edges inclined to the longitudinal direction, so that the edges come into contact with the respective step portions to restrict the pivot angle.

The step portions and the edges are located outside of the link member retainer and, therefore, a mold for forming the link member can be simplified and thus the cost for making the cable retainer can be reduced.

BRIEF DESCRIPTION OF THE DRAWINGS

Referring to the appended drawings, a preferred embodiment of the invention is described in detail, wherein;

FIG. 5 is a view showing a chain cable retainer known in the prior art; and

FIG. 6 is a view of a link member used in the chain cable retainer shown in FIG. 5.

DESCRIPTION OF THE PREFERRED EMBODIMENTS

Figure 1:
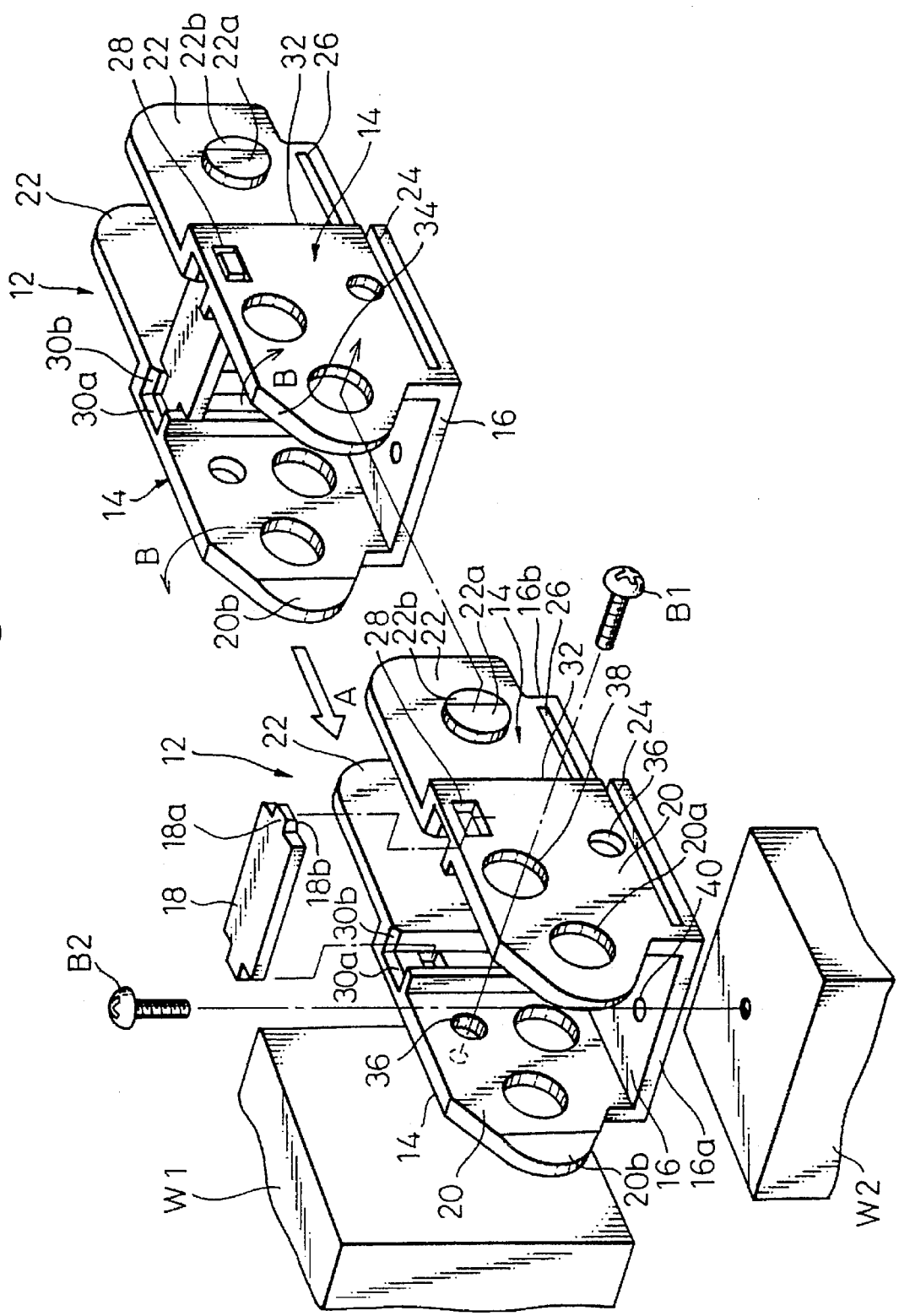
FIG. 1 is a perspective view showing the structure of the link members constituting an embodiment of a chain cable retainer according to this invention.
Figure 2:
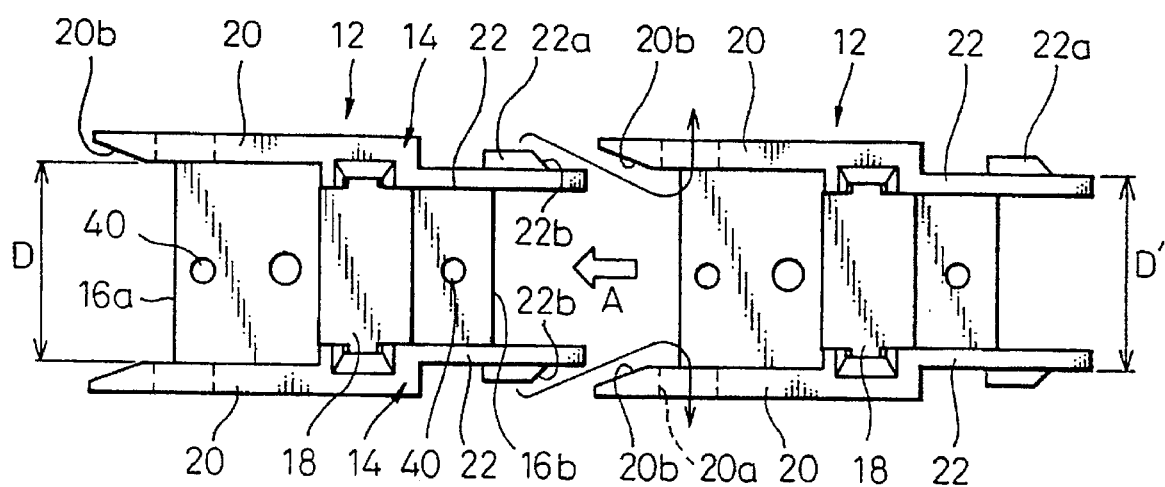
FIG. 2 is a plan view of the link members shown in FIG. 1 viewed from the top.

In FIGS. 1 and 2, a chain cable retainer according to the present invention comprises a plurality of same-size link members 12 which are connected to each other in a longitudinal direction to form a flexible guide for guiding a cable. Each link member 12 comprises a pair of side plates 14, 14 spaced horizontally from each other and extending in a longitudinal direction, a bottom plate 16 for mutually connecting the bottom ends of the pair of side plates 14, and a beam member 18 for partly closing the top of side plates 14 in order that a cable placed between the pair of side plates 14 cannot leave the link member 12. Such a link member 12 can be made of any suitable synthetic resin.

The side plates 14, 14 include a pair of outside plates 20, 20 constituting a front part of the link member 12 (the left side in FIG. 1) and a pair of inside plates 22, 22 integrally connected to the rear ends of the respective outside plates 20, 20. The distance between the inner walls of the outside plates 20, 20 is D shown in FIG. 2, and the distance between the outer walls of the inside plates 22, 22 is D'. D' is slightly smaller than D. Since the outer distance D between the inside plates 22, 22 is slightly smaller than the inner distance between the outside plates 20, 20, the pair of the inside plates 22, 22 can be inserted between the outside plates 20, 20, as shown in FIGS. 1 and 2.

Figure 3:
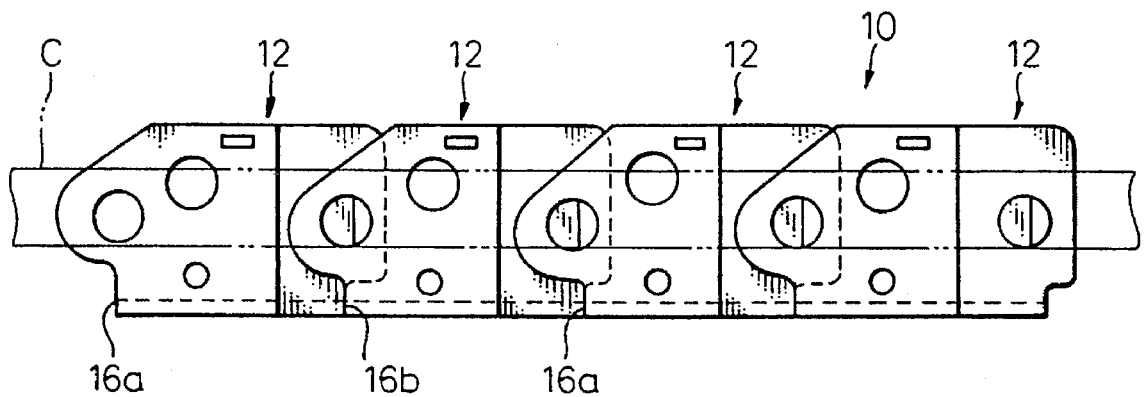
FIG. 3 is a view showing a connected state of the plurality of the link members to constitute a chain cable retainer.

The outer walls of the inside plates 22, 22 are arranged with cylindrical projections 22a, 22a and the outside plates 20, 20 are arranged with holes 20a, 20a which fit the respective projections 22a, 22a. Thus, the link member 12 can be engaged with an adjacent link member 12, in such a manner that a link members 12 can be pivotably moved with respect to the adjacent link member within a certain range. Thus, a series of chain cable retainers 10 can be formed by connecting, one by one, a predetermined number of link members 12 as shown in FIG. 3.

Further, a front end of the inner wall of each outside plate 20 is formed with a slope 20b and, on the other hand, a rear end of each projection 22a is formed with a slope 22b. Thus, when two link members 12, 12 are slid toward each other in a direction of an arrow A in FIG. 1, the two link members 12 can be smoothly fitted to each other, since the front ends of the outer plates 20, 20 can easily ride over the rear ends of the projections 22a, 22a. Thus, two link members 12, 12 can be smoothly connected.

In addition, when the front ends of the outside plates 20, 20 ride over the projections 22a, 22a, the outside plates 20, 20 must open outwardly in a direction of the arrow B in FIG. 1. For such a purpose, the outside plates 20, 20 are provided with thin, longitudinal grooves 24, 24, as low rigidity parts, in the vicinity of the bottom plate 16, that is, near the connecting portions of the outside plates 20 and the bottom plate 16, so that the outside plates can easily open outwardly. The longitudinal grooves 24, 24 of outside plates 20 in the vicinity of the bottom plate 16 function as hinges so that the outside plates 20 can easily open in the direction of the arrow B and thus the link members 12 can be easily connected.

When connecting the link members 12 to each other, the slopes 20b and 22b, and longitudinal grooves 24, 24 help the operation of connecting the link members 12. However, when removing the link member 12 from each other, such slopes 20b and 22b will not help the removal operation. Therefore, the longitudinal grooves 24, 24 are particularly advantageous when disconnecting the link members 12 from each other.

That is, the outside plates 20, 20 must be manually opened in the direction of an arrow B to remove the projections 22a, 22a from the holes 20a, 20a. Conventionally, a special tool is necessary to open such outside plates, but in the present invention, owing to the long grooves 24, 24, the outside plates 20, 20 can be manually opened to remove the connected link members 12. The longitudinal grooves 24, 24 reduce the rigidity only at parts of the outside plate 20 to allow opening of the outside plates 20, 20, and they do not reduce the rigidity of the outside plates 20, 20 as a whole.

In the same manner as the outside plates 20, 20, the inside plates 22 are arranged with longitudinal grooves 26, 26. The grooves 26, 26 function only to facilitate the connection and disconnection of the link members 12, 12. That is, the grooves 24, 24 function to facilitate the opening of the outside plates 20, 20 and the grooves 26, 26 function to facilitate the closing of the inside plates 22, 22. Thus, the outside plates 20, 20 and the inside plates 22, 22 can be easily deformed in complementary directions.

The tops of the outside plates 20, 20 are arranged with the rectangular openings 28, 28. Engaging projections 18a, 18a formed on the ends of the beam member 18 are inserted into the openings 28, 28 so that the beam member 18 is connected to the link member 12. The beam member 18 prevents the cable held in the link member 12 from coming out of the link member 12. When the beam member 18 is to be connected to the link member 12, the outside plates 20, 20 are opened in the direction of the arrow B to insert the engaging projections 18a into the respective openings 28, 28. To facilitate this, each of the outside plates 20, 20 is formed at the top thereof with slopes 30a and 30b. On the other hand, the engaging projections 18a, 18a of the beam member 18 are formed at the bottom thereof with slopes 18b, 18b. Thus, when the beam member 18 is to be connected to the link member 12, the beam member 18 is simply pushed from above into the space between the outside plates 20, 20. Thus, the slopes 18b, 18b slidingly move along the slopes 30a, 30b and thus the beam member 18 is easily connected to the link member 12.

Figure 4:
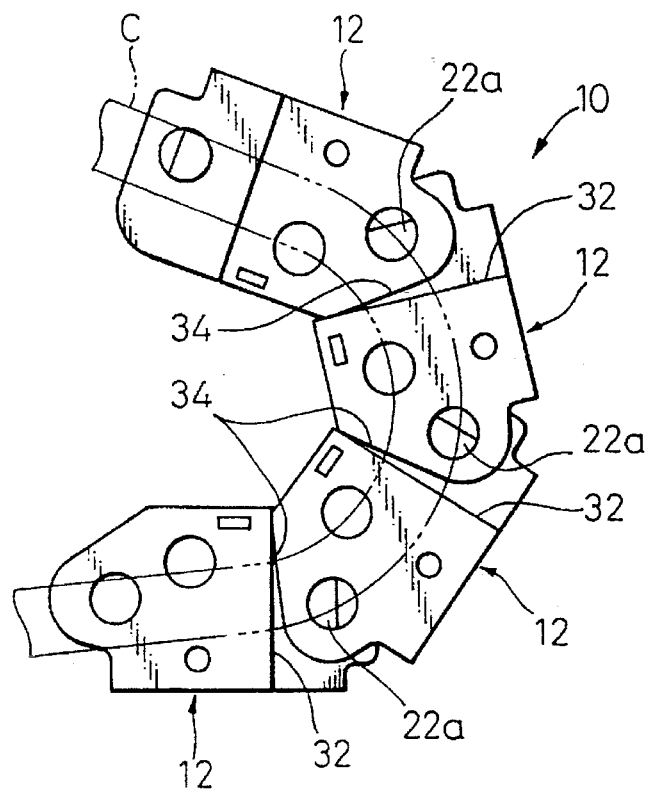
FIG. 4 is a view showing a bent state of the chain cable retainer.
Figure 3:
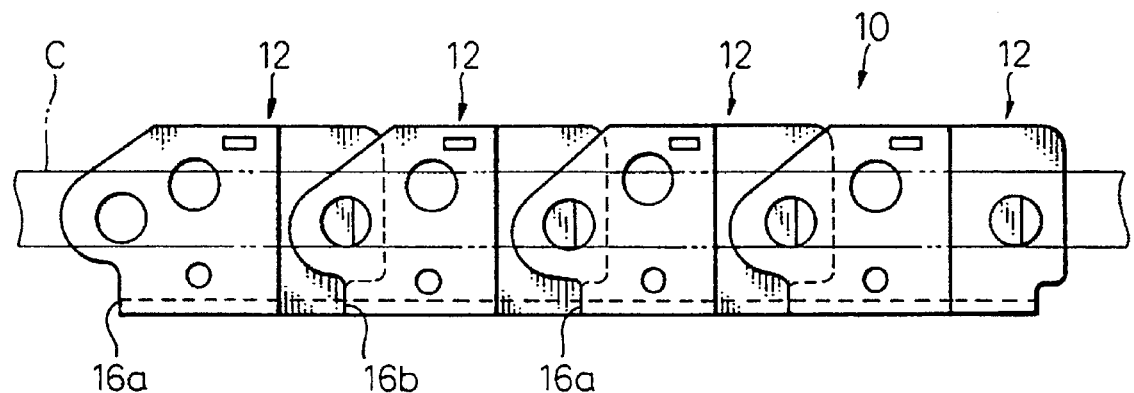
Figure 4:
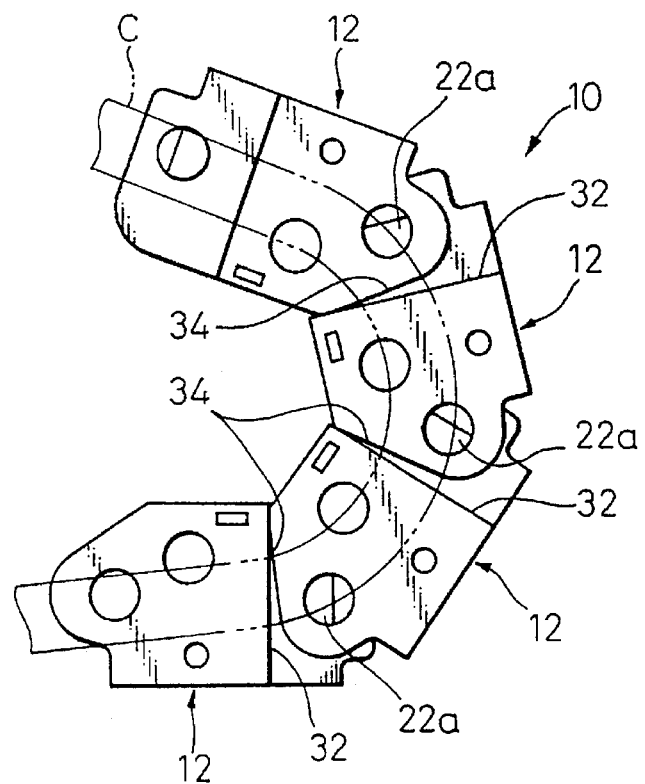

The rear ends 32, 32 of the outside plates 20, 20 are linearly formed as step portions extending in the vertical direction. On the other hand, the front portions of the outside plates 20, 20 extend forward from the bottom plate 16 and the top edges thereof are formed with slopes 34. Thus, the rear ends 32, 32 and the slopes 34, 34 cooperate to limit the angle of pivotal movement of the link member 12 with respect to the adjacent link member 12. As shown in FIG. 4, when the chain cable retainer 10 is pivoted, the pivot angle between two adjacent link members 12 cannot exceed a predetermined angle.

Without such a function, the radius of curvature of the chain cable retainer might be so large that the cable held therein might be damaged due to repeated bending stress. Thus, it is necessary that a limitation of the radius of curvature is provided by the chain cable retainer.

In this embodiment, since the distance D between the inner faces of the outside plates 20, 20 is equal to or slightly larger than the distance D' between the outer faces of the inside plates 22, 22, the above-mentioned step portions (the rear ends 32, 32) of the outside plates 20, 20 are provided between outer walls of the inside and outside plates 20, 20 and 22, 22. Thus, the angle of pivotal movement between the two adjacent link members 12, 12 can be limited by cooperating between rear and front ends of the outside plates 20, 20. Thus, no special means for limiting the pivotal angle is required. Thus, the cost can be reduced because of simplicity of making the link members 12.

As shown in FIG. 3, when the chain cable retainer 10 is straight, the front end 16a of the bottom plate 16 of the link member 12 rests against the rear end of the bottom plate 16 of the adjacent link member so that the chain cable retainer 10 is prevented from bending in the reverse direction. In other words, the chain cable retainer 10 can be freely, pivotably moved between a first position shown in FIG. 3 in which the front, slopes 34, 34 of the outside plates 22, 22 are in contact with the step portions 32, 32 and a second position shown in FIG. 4 in which the front end 16a of the bottom plate 16 is in contact with the rear end 16b of the bottom plate 16 of the adjacent link.

In this connection, the front end 16a of the bottom plate 16 is located at a position corresponding to the holes 20a, 20a and the rear end 16b of the bottom plate 16 is located at a position corresponding to the projections 22a, 22a.

Returning to FIG. 1, the outside plates 20, 20 of the link member 12 is arranged with mounting holes 36, 36 to fix the link member 12 to the object W1 (for example, a body of a mechanical machine, such as an industrial robot, or a movable part in relation to this machine). A screw B1 is inserted into the hole 36 so that the end of chain cable retainer 10 is fixed to the object W1. Since several such holes 36, 36 can be provided on the outside plates 20, 20, it is possible that the end of chain cable retainer can be fixed to the object without preparing a special latch or any other tool. Thus, the cable retainer is constituted of single type of part (i.e., the same-size link member 12) and therefore it is possible to reduce the cost for producing the cable retainer.

The outside plate 20, facing the opposite outside plate 20 formed with the mounting hole 36, is provided with a tool insertion hole 38 through which a tool, for example, a screwdriver, can be inserted to rotate the screw B1 supported on the hole 36. Thus, there are no obstacles in fixing the link member 12.

The bottom plate 16 is also provided with a mounting hole 40 and, therefore, if desired, the part of the link member 12 which is fixed to the object can be changed. That is to say, the part of link member 12 to be fixed can be selected freely from either one of the side surfaces or from the bottom surface.

It will be understood by those skilled in the art that the foregoing description relates to only a preferred embodiment of the disclosed invention, and that various changes and modifications may be made to the invention without departing from the spirit and scope thereof.

I claim:

1. A chain cable retainer comprising a plurality of same-size link members made of a resilient material, and connected to each other in a longitudinal direction to form a flexible guide for guiding therein a cable, each of said link members comprising:

a bottom plate;

a pair of side plates integrally attached to said bottom plate and extending in the longitudinal direction of said bottom plate and perpendicularly outwardly from the edges of said bottom plate, said plates being spaced from each other and forming a substantially "U" shaped cable guide passage between said side plates;

said pair of side plates comprising a pair of front, outside plates having respective inner faces and a pair of rear, inside plates integrally connected to respective rear ends of said outside plates and having respective outer faces, so that said inner faces of said outside plates of one of said link members fits within said outer faces of said inside plates of an immediately adjacent link member when said link members are connected end-to-end;

said pair of outside plates having respective forward portions extending outwardly from said bottom plate;

engaging means comprising projections protruding in a transverse direction on each of said inside plates and holes on each of said outside plates for receiving said protruding projections when said links are connected end-to-end;

said projections and said holes being engaged with each other for pivotally linking one of said link member to an adjacent link member;

restricting means for restricting the pivot angle of said link member with respect to the adjacent link member to a certain range;

said restricting means comprising: step portions located at the connecting portions between said outside plates and said inside plates, and at said forward portions of the outside plates, so that said forward portions come into contact with said respective step portions to restrict said pivot angle, wherein said step portions are flat planes perpendicular to said longitudinal direction and said forward portions of the side plates have respective edges inclined to the longitudinal direction, so that said edges come into contact with said respective step portions to restrict said pivot angle and wherein each link member is pivotally moved, with respect to the adjacent link member, between a first position in which the rear end of the bottom plate is in contact with a front end of the adjacent link member and a second position in which said edges are in contact with said respective step portions, the rear end of the bottom plate, at said first position, being in contact with the front end of the bottom plate of the adjacent link member, so that the bottom plates of adjacent link members are in straight alignment.

2. A chain cable retainer, according to claim 1, further comprising at least one low-rigidity part provided on said side plates, so that said pair of inside plates can be easily inserted into said pair of outside plates to engage said projections with said holes.

3. A chain cable retainer according to claim 2, wherein said low-rigidity part is provided on said side plates in the vicinity of said bottom plate.

4. A chain cable retainer according to claim 3, wherein said low-rigidity part comprises a groove extending in the longitudinal direction.

5. A chain cable retainer according to claim 1, wherein a hole is provided on each outside plate and a projection is provided on each inside plates and said forward portions of the outside plates are provided on said inner faces thereof with first slopes, and said projections are provided with second slopes, so that said projections can easily be inserted into and engaged with said holes.

6. A chain cable retainer according to claim 1, wherein said bottom plate has at least one mounting hole.

7. A chain cable retainer according to claim 1, wherein one of said pair of outside plates has a mounting hole for receiving mounting means and the other outside plate has, at a corresponding position, an auxiliary hole for inserting a mounting tool.

* * * * *